United States Patent [19]

Nomura et al.

[11] Patent Number: 5,591,795
[45] Date of Patent: Jan. 7, 1997

[54] POLYPROPYLENE COMPOSITION

[75] Inventors: Takao Nomura, Toyota; Takeyoshi Nishio, Okazaki; Mikio Hashimoto; Satoru Moriya, both of Waki-cho, all of Japan

[73] Assignees: Mitsui Petrochemical Industries, Ltd., Tokyo; Toyota Jidosha Kabushiki Kaisha, Toyota, both of Japan

[21] Appl. No.: 392,814

[22] PCT Filed: Jun. 30, 1994

[86] PCT No.: PCT/JP94/01064

§ 371 Date: Feb. 27, 1995

§ 102(e) Date: Feb. 27, 1995

[87] PCT Pub. No.: WO95/01398

PCT Pub. Date: Jan. 12, 1995

[30] Foreign Application Priority Data

Jun. 30, 1993 [JP] Japan .................................. 5-161962
Sep. 1, 1993 [JP] Japan .................................. 5-217501

[51] Int. Cl.$^6$ ............................. C08K 3/00; C08L 53/00
[52] U.S. Cl. ..................... 524/451; 524/505; 525/88; 528/481
[58] Field of Search ............................. 525/88; 524/505, 524/451; 528/481

[56] References Cited

U.S. PATENT DOCUMENTS

| | | | |
|---|---|---|---|
| 4,621,114 | 11/1986 | Watanabe | 524/451 |
| 5,001,182 | 3/1991 | Maruya et al. | 524/505 |
| 5,039,525 | 8/1991 | Tamashima et al. | |
| 5,308,908 | 5/1994 | Fukui et al. | 525/88 |
| 5,438,091 | 8/1995 | Saito et al. | 525/88 |

FOREIGN PATENT DOCUMENTS

| | | |
|---|---|---|
| 0235956 | 2/1987 | European Pat. Off. . |
| 0265075 | 9/1987 | European Pat. Off. . |
| 0509662 | 3/1992 | European Pat. Off. . |
| 103478 | 8/1979 | Japan . |
| 60-60154 | 4/1985 | Japan . |
| 60-58459 | 4/1985 | Japan . |
| 61-36348 | 2/1986 | Japan . |
| 61-233048 | 10/1986 | Japan . |
| 62-235350 | 10/1987 | Japan . |
| 63-122751 | 5/1988 | Japan . |
| 63-150343 | 6/1988 | Japan . |
| 1149845 | 6/1989 | Japan . |
| 1204947 | 8/1989 | Japan . |
| 1271450 | 10/1989 | Japan . |
| 0598128 | 4/1993 | Japan . |
| 2243367 | 4/1990 | United Kingdom . |
| 2246358 | 6/1991 | United Kingdom . |

OTHER PUBLICATIONS

Journal of the Physical Society of Japan, vol. 54, No. 10, Oct. 1995 pp. 3668–3670.
Journal of Polymer Science: Part B: Polymer Physics, vol. 25, 1829–1837 (1987).
SAE Technical Paper Series 920525, pp. 121–131, Development of Super Olefin Bumper for Automobiles, Feb. 24–28, 1992.
Kobunshi Ronbunshu, vol. 50, No. 1, pp. 12–25 (w/partial Eng. transl.).
Kobunshi Ronbunshu, vol. 50, No. 1, pp. 27–34 (w/Eng. Abstract).
Kobunshi Ronbunshu, vol. 50, No. 2, pp. 81–86 (w/partial Eng. transl.).
Kobunshi Ronbunshu, vol. 50, No. 2, pp. 87–91 (w/partial Eng. transl.).

*Primary Examiner*—Carman J. Seccuro, Jr.
*Attorney, Agent, or Firm*—Sherman and Shalloway

[57] ABSTRACT

The polypropylene composition of the present invention comprises polypropylene and a rubber component, and has the following characteristics that (i) the melt flow rate (MFR: 230° C., 2.16 kg load), as measured in accordance with ASTM D1238, is not less than 8 g/10 min, (ii) the flexural modulus (FM), as measured in accordance with ASTM D790, is not less than 20,000 kg/cm$^2$, (iii) the Izod impact strength (IZ), as measured in accordance with ASTM D256, is not less than 20 kg.cm/cm,

(iv) the heat deflection temperature (HDT), as measured in accordance with ASTM D648, is not lower than 135° C., (v) the dimensions of a polypropylene microcrystal in an injection molded article formed from the polypropylene composition, as measured by wide-angle X-ray diffractometry and small-angle X-ray scattering, are 5 nm–20 nm, 5 nm–20 nm and not less than 5 nm, respectively, in the directions of c-axis, a-axis and b-axis, and (vi) the rubber component is present in an injection molded article formed from the polypropylene composition as a continuous phase around the polypropylene microcrystal in the direction of injection and the direction perpendicular thereto, and the average thickness of this rubber continuous phase is in the range of from 0.5 nm–3 nm.

Such a polypropylene composition as described above is excellent in rigidity and heat resistance, and also in impact resistance and toughness.

11 Claims, 1 Drawing Sheet

F I G. 1

POLYPROPYLENE COMPOSITION

TECHNICAL FIELD

This invention relates to a polypropylene composition excellent in rigidity and heat resistance and also in impact resistance and toughness.

TECHNICAL BACKGROUND

A crystalline polypropylene is excellent in rigidity, heat resistance, surface glossiness, etc., and however, there is a problem that the polypropylene is poor in impact resistance.

On that account, there have heretofore been proposed various methods to improve the impact resistance of such a polypropylene, for example, there is known a method in which crystalline polypropylene is incorporated with modifiers such as polyethylene, rubbery substance, etc. As such a rubbery substance (rubber component), an amorphous or a low crystalline ethylene/propylene random copolymer (EPR), polyisobutylene, polybutadiene, etc. are generally used.

In order to improve the impact strength of polypropylene by incorporation of such a rubbery substance into the polypropylene, however, a large amount of the rubbery substance must be contained in the polypropylene. Although the polypropylene composition thus contained a large amount of the rubbery substance is certainly improved in impact resistance, there was such problem that the composition largely deteriorates in rigidity, heat resistance and surface hardness.

Under such circumstances, there have been proposed various polypropylene compositions which contain the rubbery substance as mentioned above together with inorganic fillers such as talc in order to impart rigidity to the compositions (see, for example, Japanese Patent L-O-P Publns. Nos. 58459/85, 60154/85, 233048/86, 36348/86, 235350/87, 122751/88, 150343/88, 149845/89, 204947/89 and 271450/89).

Such a polypropylene composition containing a large amount of the rubbery substance, however, has a limit in improving their rigidity by means of incorporation thereinto of the inorganic filler, and hence there was such a problem that it is difficult to use the composition for the purposes where a high rigidity of the composition is required.

Therefore, it has been desired to develop a polypropylene composition excellent not only in rigidity and heat resistance but also in impact resistance and toughness.

Researches conducted by the present inventors on the polypropylene composition as referred to above resulted in the finding that in the case of conventionally known polypropylene compositions formed from polypropylene and an ethylene/propylene random copolymer (rubber component), a part of the amorphous component in the polypropylene is mingled in the rubber component, and this rubber component is bound by the amorphous component of the polypropylene, with the result that no sufficient effect of the rubber component for improving the impact resistance can be exhibited.

Then, the present inventors have found that in order to obtain a polypropylene composition excellent not only in rigidity and heat resistance but also in impact resistance, it is necessary to form a polymer alloy (polypropylene composition) having a molecular composite-like structure in which the rubbery substance (rubber component) is used as a matrix and polypropylene (crystal component) is used as a dispersion phase, differing from a polymer alloy formed from polypropylene and the rubbery substance which has a generally-known structure as mentioned above. Further, the present inventors have found that when a polypropylene composition has a structure in which the polypropylene microcrystals have a specific dimension in the directions of a-, b- and c-axes and the rubber component is present around the polypropylene microcrystals as a continuous phase having a specific average thickness, such a polypropylene composition is excellent in rigidity and heat resistance and also in impact resistance. Based on these findings, the present invention has been accomplished.

Incidentally, there has been made an attempt to obtain a polypropylene composition excellent in impact resistance by mixing polypropylene with other ethylene/α-olefin copolymers in place of the aforementioned amorphous or low crystalline ethylene/propylene random copolymers used as the rubbery substance. For instance, Japanese Patent Publication Nos. 25693/83 and 38459/83 disclose a composition containing a crystalline polypropylene and an ethylene/1-butene copolymers where the amount of the units derived from 1-butene is not more than 15 mol %, and also Japanese Patent L-O-P Publn. No. 243842/86 discloses a polypropylene composition containing a crystalline polypropylene and an ethylene/1-butene copolymer obtained by the use of a titanium-containing inhomogeneous catalyst system. The polypropylene compositions disclosed in these patent publications have certainly been improved in impact resistance and rigidity, however, their further improvement in impact resistance and toughness at low temperatures are desired.

Further, Japanese Patent Publication No. 42929/88 discloses a polypropylene composition containing a crystalline polypropylene and an ethylene/1-butene copolymer where the amount of the units derived from 1-butene is 25–10% by weight and the intrinsic viscosity [η] of the copolymer is not more than 1.5 dl/g, however, the disclosed polypropylene composition fails to exhibit sufficient impact resistance.

Furthermore, Japanese Patent L-O-P Publn. No. 250040/91 discloses the use of an ethylene/1-butene block copolymer having 10–90% by weight of the units derived from 1-butene as an impact resistance improver for polypropylene, however, this ethylene/1-butene block copolymer is poor in compatibility with polypropylene and the effect of improving impact resistance as expected from the improver is insufficient.

The present invention has been made in view of the foregoing prior arts, and an object of the invention is to provide a polypropylene composition which is excellent in impact resistance and toughness as well as in rigidity and heat resistance, and also excellent in impact resistance at low temperatures.

DISCLOSURE OF THE INVENTION

The polypropylene composition of the present invention comprises polypropylene and a rubber component, and has the following characteristics that (i) the melt flow rate (MFR: 230° C., under a load of 2.16 kg), as measured in accordance with ASTM D1238, is not less than 8 g/10 min, preferably 10 g/10 min, (ii) the flexural modulus (FM), as measured in accordance with ASTM D790, is not less than 20,000 kg/cm$^2$, (iii) the Izod impact strength (IZ), as measured in accordance with ASTM D256, is not less than 20 kg.cm/cm, (iv) the heat deflection temperature (HDT), as measured in accordance with ASTM D648, is not lower than 135° C., (v) the dimensions of a polypropylene microcrystal in an injection molded product of the polypropylene composition, as measured by wide-angle X-ray diffractometry and small-angle X-ray scattering, are 5 nm–20 nm, 5 nm–20 nm and not less than 5 nm, respectively, in the directions of c-axis, a-axis and b-axis, and (vi) in the injection molded product, the rubber component is present as a continuous phase around the polypropylene microcrystal in the direction of injection and the direction perpendicular thereto, and the average thickness of this rubber continuous phase is in the range of 0.5 nm–3 nm.

The polypropylene composition may be formed, for example, from

[A] 60–85% by weight of a propylene block copolymer having (1) a melt flow rate (MFR: 230° C. load 2.16 kg), as measured in accordance with ASTM D1238, of 10–60 g/10 min, containing (2) 3–13% by weight of a 23° C. n-decane soluble component, the intrinsic viscosity [η] of the 23° C. n-decane soluble component being 4–12 dl/g, and the 23° C. n-decane soluble component containing the units derived from ethylene in an amount of 30–60 mol %, and having (3) an MFR of the polypropylene component being 20–80 g/10 min, and a pentad isotacticity ($I_5$) of the polypropylene, as determined by $^{13}$C-NMR method, being not less than 0.97;

[B] 10–25% by weight of an ethylene/α-olefin random copolymer containing (1) the units derived from ethylene in an amount of 60–90 mol %, having (2) an intrinsic viscosity [η] in decalin of 1.5–3.5 dl/g, (3) a glass transition temperature (Tg) of not higher than –50° C. or a melting point, measured by DSC method as a main peak, of not higher than 90° C., and (4) a crystallinity, as measured by X-ray diffractometry, of less than 20%; and

[C] 5–15% by weight of an inorganic filler.

As the above mentioned ethylene/α-olefin random copolymer there can be used an ethylene/1-butene random copolymer containing.

(1) the units derived from 1-butene in an amount of 15–25 mol %, having (2) an intrinsic viscosity [η] in decalin of 1.8–3.5 dl/g, (3) a glass transition temperature (Tg) of not higher than –55° C. or a melting point, measured by DSC method as a main peak, of not higher than 90° C., and (4) a crystallinity, as measured by X-ray diffractometry, of less than 20%, and (5) a random parameter (B value), as determined by $^{13}$C-NMR method, of 1.0–1.4, is used, there can be formed a polypropylene composition (I) having (i) a melt flow rate (MFR) of not less than 8 g/10 min, (ii) a flexural modulus (FM), as measured in accordance with ASTM D790 under the condition of a crosshead speed of 2 mm/min, of not less than 20,000 kg/cm$^2$, (iii) an Izod impact strength (IZ) at 23° C., as measured in accordance with ASTM D256 using a notched test specimen of 6.4 mm thick, of not less than 20 kg.cm/cm, and (iv) a heat deflection temperature (HDT) (4.6 kg load), as measured in accordance with ASTM D648 under the condition of a load of 4.6 kg/cm$^2$, of not lower than 135° C.

Furthermore, when the polypropylene composition (I) of the present invention is subjected to heat treatment at 135°–165° C. for 20–180 minutes, there can be obtained a polypropylene composition (II) having (i) a flexural modulus (FM), as measured in accordance with ASTM D790 under the condition of a crosshead speed of 2 mm/min, of not less than 23,000 kg/cm$^2$, (ii) an Izod impact strength (IZ) at 23° C., as measured in accordance with ASTM D256 using a notched test specimen of 6.4 mm thick, of not less than 40 kg.cm/kg, (iii) a heat deflection temperature (HDT), as measured in accordance with ASTM D648 under the condition of a load of 4.6 kg/cm$^2$, of not lower than 150° C., (iv) a brittleness temperature at low-temperature range (BTc), as measured in accordance with ASTM D746, of not higher than –30° C., and (v) a long period, as measured by small-angle X-ray scattering, of not less than 200 Å.

PREFERRED EMBODIMENT OF THE INVENTION

The polypropylene composition of the present invention is described below in detail.

The polypropylene composition of the invention comprises polypropylene and a rubber component and has the following characteristics.

(i) The melt flow rate (MFR: 230° C., 2.16 kg load), as measured in accordance with ASTM D1238, is not less than 8 g/10 min, preferably not less than 10 g/10 min, more preferably 10–50 g/10 min.

(ii) The flexural modulus (FM), as measured in accordance with ASTM D790 at a crosshead speed of 2 mm/min, is not less than 20,000 kg/cm$^2$, preferably 20,000–25,000 kg/cm$^2$.

(iii) The Izod impact strength (IZ) at 23° C., as measured in accordance with ASTM D256 using a notched specimen of 6.4 mm thick, is not less than 20 kg.cm/cm, preferably 25–60 kg.cm/cm and especially 30–60 kg.cm/cm.

(iv) The heat deflection temperature (HDT), as measured in accordance with ASTM D648 under the condition of a load of 4.6 kg/cm$^2$, is not lower than 135° C.

The injection molded product formed from the polypropylene composition comprising polypropylene and a rubber component of the present invention has a structure such that the polypropylene has been dispersed in the rubber component (matrix) as finely powdered crystals having specified dimensions in the directions of a-axis, b-axis and c-axis. The injection molded product formed from such a polypropylene composition can be analyzed by X-ray diffractometry, small-angle X-ray scattering and an electron microscope in the manner as will be mentioned later, and concretely the injection molded product has the following characteristics.

(v) The dimensions of a polypropylene microcrystal measured by X-ray diffractometry and small-angle X-ray scattering are 5 nm–20 nm in the direction of c-axis, 5 nm–20 nm in the direction of a-axis, and not less than 5 nm, preferably 5 nm–100 nm, more preferably 5 nm–30 nm in the direction of b-axis, respectively.

(vi) In this injection molded product, the rubber component is present as a continuous phase around the polypropylene microcrystal in the direction of injection and the direction perpendicular thereto, and the average thickness of the continuous phase is in the range of 0.5 nm–3nm.

Thus, in the injection molded product formed from the polypropylene composition of the present invention, the polypropylene microcrystals and the rubber component have specific structures, respectively, as described above, and hence the injection molded product is excellent in rigidity and heat resistance and also in impact resistance and toughness.

On the other hand, an injection molded product formed from the conventionally known polypropylene composition containing polypropylene and an ethylene/propylene random copolymer has a structure such that a part of the amorphous component of the polypropylene is mixed in the rubber component and the rubber component is bound in the amorphous component of this polypropylene, but fails to have such characteristics as specified in the present invention. In such a polypropylene composition, no sufficient effect of improving impact resistance can be obtained and, moreover, it has been necessary, as aforementioned, to contain a large amount of the rubber component (ethylene/propylene random copolymer or the like) in the polypropylene composition in order to improve the impact resistance.

In the present invention, the dimensions of the polypropylene microcrystal may be determined by X-ray diffractometry (the determination is conducted by using an X-ray diffraction apparatus, RU-200A, of Rigaku Denki K. K.) as will be illustrated below. In the following measurement, the calculation is made in terms of the wavelength of X-ray of 1.5418 Å.

Measurement of the dimension of polypropylene microcrystal

The crystal dimension of a polypropylene microcrystal in the b-axis direction and the a-axis direction may be obtained from the intensity of wide-angle X-ray diffraction.

The dimension of a polypropylene microcrystal is calculated using Scherrer's equation from a half-width of a peak due to the (040) face and the (110) face of polypropylene crystal.

(1) The dimension of crystal in the b-axis direction is obtained from a half-width of the peak due to the (040) face.

(2) The dimension of crystal in the a-axis direction is determined as a value obtained by multiplying a value calculated using Scherrer's equation from a half-width of the peak due to the (110) face by a ratio of the length (21.99 Å) of a diagonal line of a-b face in the unit lattice to the length (20.96 Å) of the b-axis.

(3) The dimension of crystal in the c-axis direction is determined as a value (long period Å x X%) obtained by multiplying the crystallinity (X%) as measured by X-ray diffractometry by the long period (Å) of homopolypropylene as measured by small-angle X-ray scattering intensity.

The long period of this homopolypropylene is calculated according to Bragg's equation from the scattering angle showing a peak obtained by measuring small-angle X-ray scattering intensity.

Measurement of thickness of rubber phase

The thickness of the rubber phase is determined as a difference between the following two long periods as measured according to Bragg's equation from the scattering angles showing peaks of small-angle X-ray scattering intensity.

(1) A long period as measured on a composition comprising a propylene block copolymer, an ethylene/α-olefin random copolymer and an inorganic filler.

(2) A long period as measured on a composition comprising a homopolypropylene (the value of MFR of this homopolypropylene is the same as the value of MFR of polypropylene of the propylene block copolymer present in the above-mentioned composition (1)) and the inorganic filler (the kind and amount of this inorganic filler are the same as those of the above-mentioned composition (1)).

Determination of rubber continuous phase

When a specimen of the polypropylene composition dyed with ruthenic acid is observed under an electron microscope of 150,000 magnifications, there is seen a repetition of crystal (undyed portion)-rubber (dyed portion)-crystal (undyed portion). From this electron microscopic photograph, it is possible to determine whether the rubber component is a rubber continuous phase or not.

Illustrated below is one example of the polypropylene composition of the present invention satisfying the specific conditions as mentioned above.

The polypropylene composition of the present invention is not restricted to specific component, however, it is preferred that the composition of the invention is formed, for example, from the following components as will be described later.

[A] A propylene block copolymer,

[B] an ethylene/α-olefin random copolymer, and

[C] an inorganic filler, preferably finely powdered talc.

These components are described below in detail.

[A] Propylene block copolymer

In the present invention, a specific propylene block copolymer is preferably used as polypropylene. It is desired that this propylene block copolymer is composed of a high crystalline homopolypropylene component and an ethylene/propylene copolymer rubber component which is a 23° C. n-decane soluble component, and that the propylene block copolymer fulfills the following conditions.

(1) The propylene block copolymer [A] desirably has a melt flow rate (MFR), as measured in accordance with ASTM D1238 at 230° C. and under a load of 2.16 kg, of 8–60 g/10 min, preferably 10–60 g/10 min, more preferably 15–40 g/10 min.

The polypropylene composition containing the propylene block copolymer [A] having MFR as defined above are excellent in fluidity, and it is also easy to obtain therefrom molded articles of large size. When the MFR of the polypropylene composition containing a propylene block copolymer is less than 8 g/10 min, the composition has a low fluidity and a poor moldability and hence no molded article of large size sometimes can be obtained therefrom. On the one hand, when the MFR of the polypropylene composition containing a propylene block copolymer exceeds 60 g/10 min, the composition tends to become inferior in impact strength (IZ).

(2) It is desired that the propylene block copolymer [A] contains a 23° C. n-decane soluble component in an amount of 3–13 % by weight, preferably 4–10 % by weight.

The polypropylene composition which contains a propylene block copolymer [A] containing the rubber component (23° C. n-decane soluble component) in amounts as defined above is excellent in flexural modulus and also in impact strength and low-temperature toughness. The polypropylene composition which contains a propylene block copolymer having the rubber component in a larger amount than the amounts as defined above becomes sometimes inferior in rigidity, and on the one hand, the polypropylene composition which contains the propylene block copolymer having the rubber component in an excessively smaller amount than the amounts as defined above become sometimes inferior in impact strength and low-temperature toughness.

The above-mentioned 23° C. n-decane soluble component is represented by a value to be obtained in such a manner that 5 g of the specimen (propylene block copolymer) is dissolved by immersing for 5 hours in 200 cc of boiling n-decane, the resulting solution is cooled to 23° C. to separate a solid phase which is filtered through G4 glass filter and then dried to measure the weight of the solid phase, to which the value of the 23° C. n-decane soluble component is calculated back.

An intrinsic viscosity $[\eta]$, as measured in decalin at 135° C., of the 23° C. n-decane soluble component of the propylene block copolymer [A] used in the present invention is 4–12 dl/g, preferably 5–8 dl/g.

This 23° C. n-decane soluble component desirably contains the units derived from ethylene in an amount of 30–60 mol %, preferably 35–45 mol %.

The polypropylene composition formed from the propylene block copolymer containing the 23° C. n-decane soluble component which contains the units derived from ethylene in an amount of less than 30 mol % or exceeding 60 mol % becomes sometimes inferior in impact strength (IZ).

The amount of the units derived from ethylene contained in the 23° C. n-decane soluble component and that of the units derived from ethylene contained in the propylene block copolymer as will be mentioned later may be obtained by such usual methods such as infrared spectroscopic method and NMR method.

The ethylene propylene copolymerization component (23° C. C n-decane soluble component) of the propylene block copolymer [A] used in the present invention may contain units derived from polymerizable monomer other than ethylene and propylene, to such an extent that the object of the present invention is not impaired.

Such other polymerizable monomers may include, for example, α-olefins such as 1-butene, 1-pentene, 1-hexene, 1-heptene, 1-octene, 1-decene, 1-dodecene, 1-hexadodecene and 4-methyl-1-pentene;

vinyl compounds such as vinyl cyclopentene, vinylcyclohexane and vinylnorbornane;

vinyl esters such as vinyl acetate; and unsaturated organic acids such as maleic unhydride or derivatives thereof.

(3) The polypropylene component of the propylene block copolymer [A] desirably has a melt flow rate (MFR) of 20–200 g/10 min, preferably 20–80 g/10 min, more preferably 20–60 g/10 min.

The polypropylene composition containing the propylene block copolymer having MFR of the polypropylene component of less than 20 g/10 min has a low fluidity and a poor moldability, and no molded articles of large size can be obtained sometimes therefrom, and, on the one hand, the polypropylene composition containing the propylene block copolymer having MFR of the polypropylene component of exceeding 200 g/10 min is inferior sometimes in impact strength (IZ).

The polypropylene component mentioned above desirably has a pentad isotacticity 15, as determined by $^{13}$C-NMR method, of not less than 0.97, preferably not less than 0.98.

The polypropylene composition containing the propylene block copolymer which contains the polypropylene component having $I_5$ of less than 0.97 tends to become inferior in rigidity.

The pentad isotacticity $I_5$ of the polypropylene component is measured by a method, i.e., $^{13}$C-NMR method (nuclear magnetic resonance method) proposed in Macromolecules 6, 925(1973) by A. Zambelli et al., and is a proportion (percentage) of a unit in which five propylene units are attached together continuously and isotactically in the polypropylene molecular chain.

Belonging of the peak in the above-mentioned measurement of NMR is determined in accordance with the disclosure in Macromolecules 8, 687 (1975). $^{13}$C-NMR may be measured while improving a signal detection limit up to 0.001 by accumulating the measurement 20,000 times at a frequency of 125 MHz using a Fourier-transform NMR apparatus [500 MHz (when hydrogen nucleus is measured)].

The above-mentioned propylene block copolymer [A] used in the present invention may contain as its rubber component a mixture of a ternary copolymer of ethylene, propylene and other polymerizable monomer and a propylene block copolymer in which the rubber component is a binary copolymer of ethylene and propylene.

The propylene block copolymer [A] used in the present invention desirably contains the units derived from ethylene in an amount of 2–9 mol%, preferably 2–8 mol %.

The polypropylene composition formed from the propylene block copolymer having the units derived from ethylene of less than 2 mol % tends to become sometimes inferior in impact strength (IZ), and on the one hand, the polypropylene composition containing the propylene block copolymer having the structural units in an amount of exceeding 9 mol % tends to become sometimes inferior in rigidity.

When the propylene block copolymer [A] used in the present invention contains, for example, as a prepolymer formed by prepolymerization, a homopolymer or a copolymer of the monomer such as 3-methyl-1-butene, 3,3-dimethyl-1-butene, 3-methyl-1-pentene, 3-methyl-1-hexene, 3,5,5-trimethyl-1-hexene, vinyl cyclopentene, vinyl cyclohexane and vinyl norbornane, a rate of crystallization of the polypropylene composition is improved.

The propylene block copolymer used in the present invention as described above may be prepared by various methods, for example, a polymerization using a stereoregular Ziegler-Natta catalyst. Concretely speaking, this copolymer may be prepared by using a catalyst formed from a solid titanium catalyst component and an organometallic compound catalyst component and, if necessary, an electron donor.

In the present invention, the solid titanium catalyst component is concretely a component having supported titanium trichloride or a titanium trichloride composition on a solid carrier having a specific surface area of not less than 100 m2/g, or a component having supported essential ingredients such as magnesium, halogen, electron donor (preferably aromatic carboxylic ester or alkyl-containing ether) and titanium on a solid carrier having a specific surface area of non less than 100 m2/g. Of these, preferred is the latter solid titanium catalyst component.

The organometallic compound catalyst component is desirably an organoaluminum compound which includes concretely trialkylaluminum, dialkylaluminum halide, alkylaluminum sesquihalide and alkylaluminum dihalide. The organoaluminum compound to be used may suitably be selected depending on the kinds of the titanium catalyst component used.

The useful electron donor includes organic compounds having nitrogen atom, phosphorus atom, sulfur atom, silicon atom or boron atom, and preferred is an ester compound and ether compound having the atom as mentioned above.

Such a catalyst component may further be activated by means of the copulverization technique or the like, or may be prepolymerized with olefins as mentioned above.

[B] Ethylene/α-olefin random copolymer (1) The ethylene/α-olefin random copolymer used in the present invention contains the units derived from ethylene in an amount of 60–90 mol %, preferably 75–85 mol %.

α-Olefin to be copolymerized with ethylene includes concretely propylene, 1-butene, 1-pentene, 1-hexene, 1-heptene, 1-octene, 1-decene, 1-dodecene, 1-hexadodecene, etc.

Of these, preferred is 1-butene. These α-olefins may be used in combination of two or more.

The ethylene/α-olefin random copolymer used in the present invention may also contain the units derived from other monomers than ethylene and α-olefins, for example, units derived from diene may be contained therein, if necessary.

The polypropylene composition containing the ethylene random copolymer which contains the units derived from ethylene of 90 mol % or more tends sometimes to become inferior in impact resistance, and, on the one hand, the polypropylene composition containing the ethylene random copolymer which contains the units derived from ethylene of less than 60 mol % tends sometimes to become inferior in rigidity.

The ethylene/α-olefin random copolymer [B] used in the present invention desirably has the following physical properties.

(2) It is desired that the intrinsic viscosity [η], as measured in decalin at 135° C., is 1.5–3.5 dl/g, preferably 2.0–3.0 dl/g.

The polypropylene composition containing the ethylene/α-olefin random copolymer having an intrinsic viscosity [η] of less than 1.5 dl/g tends sometimes to become inferior in IZ impact strength and, on the one hand, the polypropylene composition containing the ethylene/α-olefin random copolymer having an intrinsic viscosity [η] of exceeding 3.5 dl/g tends sometimes to become inferior in moldability because of its low fluidity.

(3) It is desired that the glass transition temperature is not higher than –50° C., preferably not higher than –55° C., or the melting point measured as a main peak according to DSC method is not higher than 90° C., preferably not higher than 80° C., especially not higher than 70° C.

The polypropylene composition containing the ethylene/α-olefin random copolymer having a glass transition temperature of exceeding –50° C. or having a melting point of exceeding 90° C. tends sometimes to become inferior in IZ impact strength.

(4) It is desired that the crystallinity, as measured by X-ray diffractometry, is not more than 20%, preferably not more than 10%.

The polypropylene composition containing the ethylene/α-olefin random copolymer having a crystallinity of exceeding 20% tends sometimes to become inferior in IZ impact strength.

The ethylene/α-olefin random copolymer [B] as described above is excellent in compatibility with polypropylene and, from this copolymer [B] and polypropylene there can be formed a composition excellent in rigidity as well as in impact resistance and, moreover, excellent in fluidity. Further, from such a propylene composition, an injection molded product excellent in appearance can be formed.

The above-mentioned ethylene/α-olefin random copolymer [B] may be prepared by using a vanadium-containing catalyst or a metallocene-containing catalyst.

Of the ethylene/α-olefin random copolymer [B], particularly preferred is an ethylene/1-butene random copolymer as mentioned below.

(1) The ethylene/1-butene random copolymer contains the units derived from 1-butene in an amount of 15–25 mol preferably 15–22 mol %.

(2) The intrinsic viscosity [η], as measured in decalin at 135° C., of the ethylene/1-butene random copolymer is 1.8–3.5 dl/g, preferably 2.0–3.0 dl/g.

(3) The glass transition temperature is not higher than –55° C., preferably not higher than –60° C., or the melting point measured as a main peak according to DSC method is not higher than 90° C., preferably not higher than 80° C. and especially not higher than 70° C.

(4) The crystallinity, as measured by X-ray diffractometry, is not more than 20%, preferably not more than 10%.

(5) The parameter (B value) of the ethylene/1-butene random copolymer showing randomness of the sequential distribution of comonomers, as determined by $^{13}$C-NMR method, is 1.0–1.4.

A composition formed from ethylene/1-butene random copolymer having a B value of less than 1.0 tends sometimes to become inferior in IZ impact strength and, on the one hand, a composition formed from the ethylene/1-butene random copolymer having a B value of exceeding 1.4 tends sometimes to become inferior in rigidity.

The B value of the ethylene/1-butene random copolymer [B] is an indication which represents a composition distribution state of the units derived from each monomer in the copolymer chain, and is obtained by dividing a mol fraction of the ethylene-1-butene alternate chain to the total diad chain in the copolymer by twice as much as the product of the ethylene content (mol fraction) and 1-butene content (mol fraction). That is, the B value is calculated from the following equation.

$$B = \frac{P_{BE}}{2 P_B \cdot P_E}$$

wherein PE and PB represent mol fractions of the ethylene and 1-butene component contained in the ethylene/1-butene copolymer, respectively, and PBE represents a mol fraction of 1-butene-ethylene chain to the total diad chain.

These values of the PE, PB and PBE may be obtained concretely from $^{13}$C-NMR spectrum, as measured in the following manner, based on reports by G. J. Ray (Macromolecules, 10, 773 (1977)), J. C. Randall (Macromolecules, 15, 353 (1982)), J. Polymer Science, Polymer Physics Ed., 11, 275 (1973), and K. Kimura (Polymer, 25, 441 (1984)).

In a test tube of 10 mmø, about 200 mg of an ethylene/1-butene copolymer is dissolved homogeneously in 1 ml of hexachlorobutadiene, and $^{13}$C-NMR spectrum of the dissolved specimen is measured under the following conditions.

Measurement temperature: 120° C.
Measurement frequency: 125 MHz
Measurements cumulated: 5,000 times In this connection, this B value becomes 2 when the ethylene/1-butene random copolymer is a perfect alternate copolymer, while the value becomes 0 when the copolymer is a perfect block copolymer.

The ethylene/1-butene random copolymer as described above is excellent in compatibility with polypropylene, and the polypropylene composition containing this copolymer is excellent in rigidity as well as in impact resistance and, moreover, excellent in fluidity, and hence a molded product excellent in appearance can be formed therefrom.

[C] Inorganic filler

Used as an inorganic filler in the present invention is generally known finely powdered talc as a modifier for polyolefin or the like.

The finely powdered talc used in the invention has an average particle diameter of 0.5–20 μm and a ratio of the length or breadth to the thickness (an aspect ratio) of not less than 2 times, preferably not less than 10 times. Further, it is desired that the content of particles having a particle diameter of not less than 5 μm of the finely powdered talc used in the present invention is not more than 5% by weight.

Polypropylene Composition

That the polypropylene composition of the present invention desirably contains, as aforesaid,

[A] a propylene block copolymer in an amount of 60–85% by weight, preferably 62–77% by weight, more preferably 62–72% by weight,

[B] an ethylene/α-olefin random copolymer in an amount of 10–25% by weight, preferably 15–25% by weight, more preferably 18–23% by weight, and

[C] an inorganic filler in an amount of 5–15% by weight, preferably 8–15% by weight, more preferably 10–15% by weight.

The polypropylene composition of the present invention may be obtained from such components as mentioned above, according to the conventionally known method for preparing a resin composition, for example, by feeding the components simultaneously or successively to a mixing machine such as Henschel mixer, V-blender, tumbler blender and ribbon blender, followed by melt-kneading with a single screw extruder, multiple screw extruder, kneader or Banbury mixer.

In this connection, by the use of the above-mentioned multiple screw extruder, kneader or Banbury mixer which are excellent in kneading performance, a polypropylene composition of high quality in which the components have been dispersed more homogeneously may be obtained.

The polypropylene composition of the present invention may contain, to such an extent that no object of the invention will be impaired, heat stabilizers, nucleating agents (which include aluminum salts of aromatic carboxylic acid, esters of aromatic phosphoric acid and dibenzylidene sorbitol), ultraviolet absorbers, slip agents, antistatic agents, flame retardants, pigments, dyes, inorganic fillers other than finely powdered talc, organic fillers, and other polymers, for example, polyethylene (PE), and propylene/ethylene random copolymer (EPR).

The polypropylene composition of the present invention is described with reference to an example as described hereinbefore, but is not limited only to that example so long as they satisfy the aforesaid specific conditions.

In the present invention, of the above-mentioned polypropylene compositions, particularly preferred is, for example, a polypropylene composition (I) which contains

[A] a propylene block copolymer in an amount of 60–85% by weight, preferably 62–77% by weight,

[B] an ethylene/1-butene random copolymer in an amount of 10–2 5% by weight, preferably 15–25% by weight, and

[C] an inorganic filler in an amount of 5–15% by weight, preferably 8–15% by weight.

As aforesaid, the ethylene/1-butene random copolymer used in the present invention is excellent in compatibility with polypropylene, and from polypropylene and this ethylene/1-butene random copolymer there may be formed the polypropylene composition (I) excellent in impact resistance as well as in rigidity, and moreover, excellent in fluidity, and also a molded product excellent in appearance can be obtained.

The polypropylene composition (I) obtained as a kneaded product of the above-mentioned propylene block copolymer, ethylene/1-butene random copolymer and inorganic filler has, as aforesaid, characteristics that (i) the melt flow rate (MFR) is not less than 8 g/10 min, preferably 10–50 g/10 min, (ii) the flexural modulus (FM) is not less than 20,000 kg/cm$^2$, preferably 20,000–25,000 kg/cm$^2$, (iii) the Izot impact strength (IZ) is not less than 20 kg.cm/cm, preferably not less than 25 kg.cm/cm, and (iv) the heat deflection temperature (HDT) (4.6 kg load) is not lower than 135° C.

Such a polypropylene composition (I) forms a molecular composite-like polymer alloy by dispersing the polypropylene component as very fine crystals in the rubber component at the time of molding, because the propylene block copolymer [A] having a high rate of crystallization is used as one of the starting materials.

The polypropylene composition of the present invention is excellent in rigidity, heat resistance and surface hardness as well as in impact resistance.

From such a polypropylene composition (I) there can be obtained an injection molded product having the characteristics (v) and (vi).

The polypropylene composition of the present invention may be obtained by heat treatment of the polypropylene composition (I) (kneaded product) under such conditions as mentioned below. In this connection, the heat treatment as mentioned below may be conducted after injection molding of the polypropylene composition (I).

The heat treated polypropylene composition (II) of the present invention may be obtained by heat treatment of the above-mentioned polypropylene composition (I) (kneaded product or molded product thereof) for 20–180 minutes, preferably for 30–60 minutes at 135°–165° C., preferably 140°–155° C. Such a heat treatment may be carried out by means of an oven or the liked. Further, this heat treatment may also be performed by utilizing a coating process for a molded product.

The heat treatment may be performed by changing the temperature and time so long as they are within the ranges as defined above.

The thus heat treated polypropylene composition (II) has the following specific physical properties that (i) the flexural modulus (FM), as measured at a crosshead speed of 2 mm/min in accordance with ASTM D790, is not less than 23,000 kg/cm$^2$, preferably 23,000–25,000 kg/cm$^2$, (ii) the Izod impact resistance (IZ) at 23° C., as measured in accordance with ASTM D256 using a notched specimen of 6.4 mm thick, is not less than 40 kg.cm/cm, preferably not less than 45 kg.cm/cm, especially preferably not less than 50 kg.cm/cm, (iii) the heat deflection temperature (HDT), as measured under a load of 4.6 kg/cm$^2$ in accordance with ASTM D648, is not lower than 150° C., (iv) the brittleness temperature at low-temperature range (BTc), as measured in accordance with ASTM D746, is not higher than −30° C., and (v) the long period, as measured by small-angle X-ray scattering, is not less than 200 Å, preferably not less than 205 Å.

The long period measured by small-angle X-ray scattering means a scattering period originated in a crystal portion (homopropylene component) of the propylene block copolymer contained in the polypropylene composition, and it can be said that the longer the period is, the better the polypropylene composition is in rigidity, heat resistance and also in impact strength and low temperature toughness.

The polypropylene composition (II) heat treated in the manner as mentioned above are extremely excellent in every property such as flexural modulus, heat deflection temperature, impact strength, low temperature impact strength or low temperature toughness.

The polypropylene composition of the present invention is excellent in rigidity and heat resistance and, moreover, they are markedly superior in physical properties such as impact resistance and toughness as compared to the conventionally known polypropylene composition.

The injection molded product formed from the polypropylene composition of the present invention as described above may be utilized in wide applications, and may be suitably used for automotive trims, particularly bumpers, etc.

Embodiment

The present invention is illustrated below in more detail with reference to examples, but it should be construed that the invention is in no way limited to these examples.

In the following examples, physical properties were measured in the manner as mentioned below.

(1) MFR: MFR was measured in accordance with ASTM D1238
Conditions: 230° C., 2.16 kg (2) Flexural modulus (FM):
FM was measured in accordance with ASTM D790.
Specimen: 12.7 mm (width) x 6.4 mm (thickness) ×127 mm (length)
Span: 100 mm
Bending rate: 2 mm/min (3) Izod impact strength (IZ):
IZ was measured in accordance with ASTM D256.
Temperature: 23° C.
Specimen: 12.7 mm (width) x 6.4 mm (thickness) ×64 mm (length)(with mechanically processed notch)

(4) Heat deflection temperature (HDT)
HDT was measured in accordance with ASTM 648.
Load: 4.6 kg/cm$^2$ (5) Dimensions of a polypropylene microcrystal in the a-axis direction, the b-axis direction and the c-axis direction were obtained in the manner as aforementioned.

(6) Rubber continuous phase was determined according to the electron microscopic method in the manner as aforementioned.

(7) The thickness of the rubber phase of an injection molded product formed from the polypropylene composition was obtained in the manner as aforementioned.

(8) Brittleness temperature at low-temperature range (BTc)
BTc was measured in accordance with ASTM D746.
Specimen: a 2 mm-thick sheet was perforated.
4.0 mm (width)×2.0 mm (thickness)×38.0 mm(length)

(9) The way of obtaining a long period according to the small-angle X-ray scattering.

A small-angle X-ray scattering intensity was measured with RU-200A Model of Rigaku Denki K.K., and a long period was then calculated on the basis of Bragg's equation from a scattering angle showing a peak.

A wavelength of X-ray applied is 1.5418 Å.

In the following examples, the components used for preparing the polypropylene compositions of the invention include those illustrated below. In the following tables, each component denoted is abridged.

[A] Propylene block copolymer
Block PPI: Propylene block copolymer
(1) MFR: 20 g/10 min
(2) 23° C. n-decane soluble component: 5% by weight
Intrinsic viscosity [η] of the 23° C. n-decane soluble component: 5.5 dl/g
Units derived from ethylene: 40 mol %
(3) Polypropylene component
MFR: 28 g/10 min $I_5$: 0.98

Block PP2: Propylene block copolymer
(1) MFR: 20 g/10 min
(2) 23° C. n-decane soluble component: 8% by weight
Intrinsic viscosity [η] of the 23° C. n-decane soluble component: 7.0 dl/g
Units derived from ethylene: 40 mol %
(3) Polypropylene component
MFR: 35 g/10 min
Pentad isotacticity $I_5$: 0.98

Block PP3: Propylene block copolymer
(1) MFR: 20 g/10 min
(2) 23° C. n-decane soluble component: 5% by weight
Intrinsic viscosity [η] of the 23° C. n-decane soluble component: 5.5 dl/g
Units derived from ethylene: 40 mol %
(3) Polypropylene component
MFR: 28 g/10 min
Pentad isotacticity $I_5$: 0.95

Block PP4: Propylene block copolymer
(1) MFR: 20 g/10 tin
(2) 23° C. n-decane soluble component: 5% by weight
Intrinsic viscosity [η] of the 23° C. n-decane soluble component: 3.0 dl/g Units derived from ethylene: 40 mol %
(3) Polypropylene component
MFR: 24 g/10 min
Pentad isotacticity $I_5$: 0.98

Block PPS: Propylene block copolymer
(1) MFR: 20 g/10 min
Units derived from ethylene: 5.9 mol %
(2) 23° C. n-decane soluble component: 8% by weight
Intrinsic viscosity [η] of the 23° C. n-decane soluble component: 5.5 dl/g
Units derived from ethylene: 40 mol %
(3) Polypropylene component
MFR: 28 g/10 min
$I_5$: 0.98

Block PP6: Propylene block copolymer
(1) MFR: 20 g/10 min
Units derived from ethylene: 7.0 mol %
(2) 23° C. n-decane soluble component: 10% by weight
Intrinsic viscosity [η] of the 23° C. n-decane soluble component: 5.5 dl/g
Structural units derived from ethylene: 40 mol %
(3) Polypropylene component
MFR: 31 g/10 min
$I_5$: 0.98
[B] Ethylene/α-olefin random copolymer
EBR-1: Ethylene/1-butene random copolymer
(1) Units derived from ethylene: 81 mol % (Units derived from 1-butene: 19 mol %)
(2) Intrinsic viscosity [η] in decalin: 2.5 dl/g
(3) Glass transition temperature (Tg): −64° C.
(4) Crystallinity: 5%
(5) B value: 1.1
EBR-2: Ethylene/1-butene random copolymer
(1) Units derived from 1-butene: 11 mol %
(2) Intrinsic viscosity [η]: 2.5 dl/g
(3) Glass transition temperature (Tg): −53° C.
(4) Crystallinity: 15%
(5) B value: 1.1
EBR-3: Ethylene/1-butene random copolymer
MFR: 0.8 g/10 rain
Structural units derived from 1-butene: 18 mol %
Structural units derived from ethylene: 82 mol %
Intrinsic viscosity [η] in decalin: 2.3 dl/g
Melting point (Tm): 35° C.
Crystallinity: 6 %
B value: 1.1
[C] Inorganic filler
Talc: Average particle diameter: 2.5 μm
Content of particles having a particle diameter of not less than 5 μm: 3% by weight Other components Homo PP: Homopolypropylene (content of the units derived from ethylene: 0 mol %)
MFR: 20 g/10 rain
Pentad isotacticity 15: 0.98
EPR-1: Ethylene/propylene random copolymer
Units derived from propylene: 20 mol %
Intrinsic viscosity [η]: 2.6 dl/g
Glass transition temperature (Tg): −54° C.
Crystallinity: 4%
B value: 1.1
EPR-2: Ethylene/propylene random copolymer
Units derived from propylene: 19 mol %
Units derived from ethylene: 81 mol %
MFR: 0.8 g/10 min
PER: Ethylene/propylene random copolymer
Units derived from propylene: 60 mol %
Intrinsic viscosity [η]: 3.0 dl/g
Glass transition temperature (Tg): −53° C.
Crystallinity: 10%
B value: 0.9

Examples 1–2

The components as shown in Table 1 were dry blended, and the resulting blends were kneaded individually at 200° C. with a twin-screw extruder to obtain polypropylene compositions, respectively.

From the thus obtained polypropylene compositions, ASTM test specimens were formed with an injection molding machine under the conditions of a resin temperature of 200° C. and a mold temperature of 40° C., whereby the aforesaid physical properties of the thus formed ASTM specimens were measured.

Results obtained are shown in Table 1.

The injection molded products obtained in Example 1 had a dimension of the polypropylene microcrystal being 9.8 nm in the direction of c-axis, 17 nm in the direction of a-axis and 18 nm in the direction of b-axis, respectively, a rubber continuous phase being present around the microcrystals in the direction of injection and the direction perpendicular thereto, and a phase structure repeating the rubber phase having an average thickness of 1.22 nm.

Comparative Examples 1–2

ASTM test specimens were formed by repeating Example 1 except that polypropylene compositions as shown in Table 1 were used instead, and the physical properties of the test specimens were measured.

Results obtained are shown in Table 1.

TABLE 1

| | | Example 1 | Example 2 | Comparative Example 1 | Comparative Example 2 |
|---|---|---|---|---|---|
| [A] | Block PP1 | 69 | 71 | | 81 |
| | Homo PP | | | 71 | |
| [B] | EBR-1 | 20 | 18 | 18 | 8 |
| [C] | Talc | 11 | 11 | 11 | 11 |
| (1) | MFR (g/10 min) | 11 | 10 | 10 | 14 |
| (2) | FM (kg · cm/cm) | 20100 | 21500 | 24000 | 24800 |
| (3) | IZ (kg/cm²) | 43 | 36 | 11 | 8 |
| (4) | HDT (°C.) | 140 | 140 | 145 | 148 |
| (5) | Polypropylene microcrystal | | | | |
| | c-axis direction (nm) | 9.8 | 9.8 | 9.8 | 9.8 |
| | a-axis direction (nm) | 17 | 17 | 16.5 | 16 |
| | b-axis direction (nm) | 18 | 18 | 16.5 | 15.5 |
| (6) | Presence of rubber continuous phase | Yes | Yes | No | No |
| (7) | Thickness of rubber phase (nm) | 1.2 | 1.1 | 0.2 | 0.1 |

Examples 3–4

The components as shown in Table 2 were dry blended, and the resulting blends were kneaded individually at 200° C. with a twin-screw extruder to obtain polypropylene compositions, respectively. From the thus obtained polypropylene compositions, ASTM test specimens were formed with an injection molding machine under the conditions of a resin temperature of 200° C. and a mold temperature of 40° C., whereby the aforesaid physical properties of the thus formed ASTM specimens were measured. Results obtained are shown in Table. 2.

Comparative Examples 3–8

ASTM test specimens were formed by repeating Example 3 except that polypropylene compositions as shown in Table 2 were used instead, and the physical properties of the test specimens were measured. Results obtained are shown in Table 2.

Figure 1:
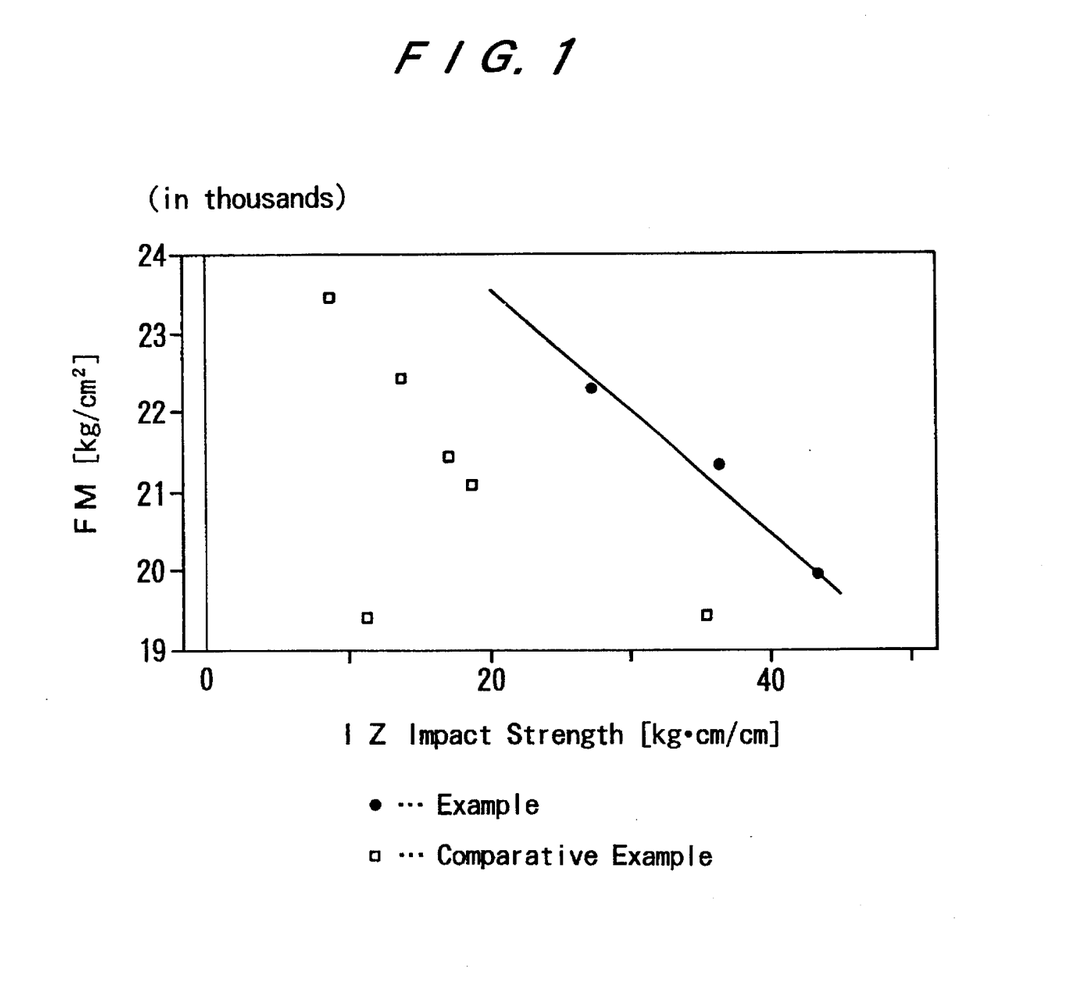
FIG. 1 is a graph showing a balance between IZ impact strength and FM in the polypropylene composition of the present invention.

FIG. 1 shows a balance between IZ impact strength and FM in the polypropylene compositions obtained individually in Examples 1–3 and Comparative Examples 3–8.

Comparative Example 9

A test specimen of the polypropylene composition was obtained by repeating Example 5 except that EPR-2 was used in place of EBR-3 and no heat treatment was conducted. Results obtained are shown in Table 3. In compari-

TABLE 2

|   |   | Example 3 | Example 4 | Comparative Example 3 | Comparative Example 4 | Comparative Example 5 | Comparative Example 6 | Comparative Example 7 | Comparative Example 8 |
|---|---|---|---|---|---|---|---|---|---|
| [A] | Block PP1 | 73 |  | 71 | 71 | 71 |  |  |  |
|  | Block PP2 |  | 71 |  |  |  |  |  |  |
|  | Block PP3 |  |  |  |  |  |  | 71 |  |
|  | Block PP4 |  |  |  |  |  |  |  | 71 |
|  | Homo PP |  |  |  |  |  | 61 |  |  |
| [B] | EBR-1 | 16 | 18 |  |  |  |  | 18 | 18 | 18 |
|  | EBR-2 |  |  | 18 |  |  |  |  |  |
|  | EPR-1 |  |  |  | 18 |  |  |  |  |
|  | PER |  |  |  |  | 18 | 10 |  |  |
| [C] | Talc | 11 | 11 | 11 | 11 | 11 | 11 | 11 | 11 |
| (1) | MFR (g/10 min) | 10 | 10 | 13 | 11 | 11 | 10 | 10 | 10 |
| (2) | FM (kg/cm$^2$) | 22400 | 21000 | 23500 | 22500 | 19500 | 21000 | 19500 | 21500 |
| (3) | IZ (kg · cm/cm) | 28 | 40 | 8 | 12 | 20 | 17 | 35 | 15 |
| (4) | HDT (°C.) | 140 | 140 | 143 | 140 | 134 | 140 | 134 | 140 |

Example 5

PP-5, EBR-3 and talc as described below were dry blended together in the proportion as shown in Table 3, and the resulting blend was kneaded with a twin-screw extruder at 200° C. to obtain a polypropylene composition. The thus-obtained polypropylene composition was injection molded with a 55-ton inline screw extruding machine of Toshiba Kikai K.K. at a cylinder temperature of 200° C. and a mold temperature of 40° C. to obtain a test specimen of the polypropylene composition. This test specimen was subjected to heat treatment for 1 hour in an air oven kept at 155° C. Results obtained are shown in Table 3.

The polypropylene composition (heat treatment product) obtained in the manner as mentioned above was excellent in impact resistance (IZ), rigidity (FM), low-temperature toughness (BTc) and heat resistance (HDT). The long period, as obtained by small-angle X-ray scattering, of this composition was 210 Å.

Examples 6–10

Heat treatment products of polypropylene compositions were obtained by repeating Example 5 except that the propylene block copolymers, blending ratio and heat treatment conditions as shown in Table 3 were employed.

The polypropylene compositions (heat treatment product) thus obtained were excellent in impact resistance (IZ), rigidity (FM), low-temperature toughness (BTc) and heat resistance (HDT). The long period, as obtained by small-angle X-ray scattering, of each composition obtained was not less than 200 Å in all cases.

son with the test specimen obtained in Example 5, that of this comparative example was inferior in impact resistance, rigidity, heat resistance and low-temperature toughness. The long period, as obtained by small-angle X-ray scattering, of the test specimen of this comparative example was 160 Å.

Referential Example 1

A test specimen of the polypropylene composition was obtained by repeating Example 5 except that EPR-2 was used in place of EBR-3. Results obtained are shown in Table 3.

The test specimen thus obtained was inferior in impact resistance, rigidity, heat resistance and low-temperature toughness to that of Example 5. The long period, as obtained by small-angle X-ray scattering, of this test specimen was 196 Å.

Referential Example 2

A test specimen of the polypropylene composition was obtained by repeating Example 5 except that homopolypropylene was used in place of the propylene block copolymer, and except that EBR-3 and talc were employed in the blending ratio as shown in Table 3. Results obtained are shown in Table 3.

The test specimen thus obtained was inferior in impact resistance, rigidity, heat resistance and low-temperature toughness to that of Example 5. The long period, as obtained by small-angle X-ray scattering, of this test specimen was 198 Å.

TABLE 3

|  |  | Example 5 | Example 6 | Example 7 | Example 8 | Example 9 | Example 10 | Comparative Example 9 | Referential Example 1 | Referential Example 2 |
|---|---|---|---|---|---|---|---|---|---|---|
| [A] | Block PP5 | 71 | 71 | 71 | 71 | 73 |  | 71 | 71 |  |
|  | Block PP6 |  |  |  |  |  | 71 |  |  |  |
|  | Homo PP |  |  |  |  |  |  |  |  | 69 |
| [B] | EBR-3 | 18 | 18 | 18 | 18 | 16 | 18 |  |  | 20 |
|  | EPR-2 |  |  |  |  |  |  | 18 | 18 |  |
| [C] | Talc | 11 | 11 | 11 | 11 | 11 | 11 | 11 | 11 | 11 |
| Heat treatment temperature (°C.) |  | 155 | 145 | 155 | 155 | 155 | 155 | no heat treatment | 155 | 155 |
| Heat treatment time |  | 1 hr | 1 hr | 2 hrs | 30 min | 1 hr | 1 hr | — | 1 hr | hr |
| (1) | MFR (g/10 min) | 10 | 10 | 10 | 10 | 11 | 10 | 10 | 10 | 10 |
| (2) | FM (kg/cm$^2$) | 23500 | 23200 | 24200 | 23300 | 24200 | 23200 | 21200 | 24500 | 24600 |
| (3) | IZ (kg.cm/cm) | 51 | 45 | 52 | 45 | 44 | 53 | 15 | 27 | 22 |
| (4) | HDT (°C.) | 161 | 155 | 164 | 157 | 158 | 159 | 144 | 162 | 162 |
| (5) | BTc (°C.) | −40 | −33 | −41 | −34 | −38 | −39 | 2 | −28 | −31 |
| (6) | Long period (Å) | 210 | 210 | 215 | 211 | 208 | 212 | 160 | 196 | 198 |

What is claimed is:

1. A polypropylene composition comprising: (A) 60–85% by weight of a propylene block copolymer consisting essentially of a crystalline homopolypropylene component and an ethylene/propylene copolymer rubber component which is soluble in 23° C. n-decane, having (1) a melt flow rate (MFR) at 230° C. under a load of 2.16 kg of 10–60 g/10 min, containing (2) 3–13 % by weight of the 23° C. n-decane soluble ethylene/propylene copolymer rubber component, said n-decane soluble component having an intrinsic viscosity (η) of 4–12 dl/g and containing the units derived from ethylene in an amount of 30–60 mol %, and having (3) a melt flow rate (MFR) at 230° C. under a load of 2.16 kg of the crystalline homopolypropylene component of 20–80 g/10 min, and a pentad isotacticity ($I_5$) of said homopolypropylene component, as determined by $^{13}$C-NMR method, being not less than 0.97;

(B) 10–25% by weight of an ethylene/α-olefin random copolymer containing (1) the units derived from ethylene in an amount of 60–90 mol %, having (2) an intrinsic viscosity (η) in decalin of 1.5–3.5 dl/g, (3) a glass transition temperature (Tg) of not higher than −55° C., or a melting point measured as a main peak by DSC method of not higher than 90° C., and (4) a crystallinity, as measured by X-ray diffractometry, of less than 20%; and (C) 5–15% by weight of an inorganic filler.

2. A polypropylene composition comprising (A) 60–85% by weight of a propylene block copolymer consisting essentially of a crystalline homopolypropylene component and an ethylene/propylene copolymer rubber component which is soluble in 23° C. n-decane, having (1) a melt flow rate (MFR) at 230° C. under a load of 2.16 kg of 10–60 g/10 min, containing (2) 3–13% by weight of the 23° C. n-decane soluble ethylene/propylene copolymer rubber component, said n-decane soluble component having an intrinsic viscosity (η) of 4–12 dl/g and containing the units derived from ethylene in an amount of 30–60 mol %, and having (3) a melt flow rate (MFR) at 230° C. under a load of 2.16 kg of the crystalline homopolypropylene component of 20–80 g/10 min and a pentad isotacticity ($I_5$) of said homopolypropylene component, as determined by $^{13}$C-NMR method, being not less than 0.97;

(B) 10–25% by weight of an ethylene/1-butene random copolymer containing (1) the units derived from 1-butene in an amount of 15–25 mol %, having (2) an intrinsic viscosity (η) in decalin of 1.8–3.5 dl/g, (3) a glass transition temperature (Tg) of not higher than −55° C., or a melting point measured as a main peak by DSC method of not higher than 90° C., and (4) a crystallinity, as measured by X-ray diffractometry, of less than 20%; and (5) a random parameter, B value, as obtained by $^{13}$C-NMR method, of 1.0–1.4; and 5–15% by weight of an inorganic filler, wherein said polypropylene composition has the following characteristics:

(i) the melt flow rate (MFR) at 230° C. under a load of 2.16 kg is not less than 8 g/10 min, (ii) the flexural modulus (FM) is not less than 20,000 kg/cm$^2$, (iii) the Izod impact strength (IZ) at 23° C. is not less than 20 kg.cm/cm, and (iv) the heat deflection temperature (HDT) is not lower than 135° C.

3. A polypropylene composition obtained by heat treatment at 135°–165° C. for 20–180 minutes of a polypropylene composition (I) comprising (A) 60–85% by weight of a propylene block copolymer consisting essentially of a crystalline homopolypropylene component and an ethylene/propylene copolymer rubber component which is soluble in 23° C. n-decane, having (1) a melt flow rate (MFR) at 230° under a load of 2.16 kg of 10–60 g/10 min, containing (2) 3–13% by weight of the 23 ° C. n-decane soluble ethylene/propylene copolymer rubber component, said n-decane soluble component having an intrinsic viscosity (η) of 4–12 dl/g and containing the units derived from ethylene in an amount of 30–60 mol %, and having (3) a melt flow rate (MFR) at 230° C. under a load of 2.16 kg of the crystalline homopolypropylene component of 20–80 g/10 min, and a pentad isotacticity ($I_5$) of said homopolypropylene component, as determined by $^{13}$C-NMR method, being not less than 0.97;

(B) 10–25% by weight of an ethylene/1-butene random copolymer containing (1) the units derived from 1-butene in an amount of 15–25 mol %, having (2) an intrinsic viscosity (η) in decalin of 1.8–3.5 dl/g, (3) a glass transition temperature (Tg) of not higher than –55° C., or a melting point, measured as a main peak by DSC method of not higher than 90° C., (4) a crystallinity, as measured by X-ray diffractometry, of less than 20%, and (5) a random parameter, B value, as determined by $^{13}$C-NMR method, of 1.0–1.4; and (C) 5–15% by weight of an inorganic filler, wherein said polypropylene composition has the following characteristics:

(i) the flexural modulus (FM) is not less than 23,000 kg/cm$^2$, (ii) the Izod impact strength (IZ) at 23° C. is not less than 40 kg.cm/kg, (iii) the heat deflection temperature (HDT), is not lower than 150° C., (iv) the brittleness temperature at low-temperature range (BTc) is not higher than –30° C., and (v) the long period, as measured by small-angle x-ray scattering, is not less than 200 Å.

4. The polypropylene composition of claim 1 wherein the α-olefin of the ethylene/α-olefin random copolymer consists essentially of 1-butene in an amount of 15–25 mol %.

5. The polypropylene composition of claim 1 having the following characteristics (i) the melt flow rate (MFR) at 230° C. under a load of 2.16 kg is not less than 8 g/10 min, (ii) the flexural modulus (FM) is not less than 20,000 kg/cm$^3$, (iii) the Izod impact strength (IZ) is not less that 20 kg.cm/cm, and (iv) the heat deflection temperature (HDT) is not lower than 135° C.

6. The polypropolylene composition of claim 1 wherein (v) the dimensions of a polypropylene microcrystal in an injection molded article formed from said polypropylene composition, are 5–20 nm, 5–20 nm and not less than 5 nm, in the directions of c-axis, a-axis and b-axis, respectively, and (vi) the ethylene/propylene copolymer rubber component is present in an injection molded article formed from said polypropylene composition as a continuous phase around the polypropylene microcrystal in the direction of injection and the direction perpendicular thereto, and the average thickness of the rubber continuous phase is in the range of from 0.5 to 3 nm.

7. The polypropylene composition of claim 2 wherein (v) the dimensions of polypropylene microcrystal in an injection molded article formed from said polypropylene composition, are 5–20 nm, 5–20 nm and not less than 5 nm, in the directions of c-axis, a-axis and b-axis, respectively, and (vi) the ethylene/propylene copolymer rubber component is present in an injection molded article formed from said polypropylene composition as a continuous phase around the polypropylene microcrystal in the direction of injection and the direction perpendicular thereto, and the average thickness of the rubber continuous phase is in the range of from 0.5 to 3 nm.

8. The polypropylene composition of claim 3 wherein (v) the dimensions of a polypropylene microcrystal in an injection molded article formed form said polypropylene composition, are 5–20 nm, 5–20 nm and not less than 5 nm, in the directions of c-axis, a-axis and b-axis, respectively, and (vi) the ethylene/propylene copolymer rubber component is present in an injection molded article formed from said polypropylene composition as a continuous phase around the polypropylene microcrystal in the direction of injection and the direction perpendicular thereto, and the average thickness of the rubber continuous phase is in the range of from 0.5 to 3 nm.

9. A polypropylene composition comprising:

(A) 60–85% by weight of a propylene block copolymer composed of a high crystalline homopolypropylene component and an ethylene/propylene copolymer rubber component which is soluble n-decane at 23° C., having (1) a melt flow rate (MFR) at 230° C. under a load of 2.16 kg of 10–60 g/10 min, containing (2) 3–13% by weight of the 23° C. n-decane soluble ethylene/propylene copolymer rubber component, said n-decane soluble component having an intrinsic viscosity (η) of 4–12 dl/g and containing the units derived from ethylene in an amount of 30–60 mol %, and said (3) high crystalline homopolypropylene component having a pentad isotacticity ($I_5$) of not less than 0.97 and a melt flow rate (MFR) at 230° C. under a load of 2.16 kg. of 20–80 g/10 min;

(B) 10–25% by weight of an ethylene/α-olefin random copolymer containing (1) the units derived from ethylene in an amount of 60–90 mol %, having (2) an intrinsic viscosity (η) in decalin of 1.5–3.5 dl/g, (3) a glass transition temperature (Tg) of not higher than –50° C., or a melting point measured as a main peak by DSC method of not higher than 90° C., and (4) a crystallinity, as measured by X-ray diffractometry, of less than 20%; and (C) 5–15% by weight of an inorganic filler, wherein said polypropylene composition has the following characteristics:

(i) the melt flow rate (MFR) at 230° C. under a load of 2.16 kg is not less than 8 g/10 min, (ii) the flexural modulus (FM) is not less than 20,000 kg/cm$^2$, (iii) the Izod impact strength (IZ) at 23° C. is not less than 20 kg.cm/cm, and (iv) the heat deflection temperature (HDT) is not lower than 135° C. wherein (v) the dimensions of a polypropylene microcrystal in an injection molded article formed from said polypropylene composition are 5–20 nm, 5–20 nm and not less than 5 nm, respectively, in the directions of c-axis, a-axis and b-axis, and (vi) the ethylene/propylene copolymer rubber component is present in an injection molded article formed from said polypropylene composition as a continuous phase around the polypropylene microcrystal in the direction of injection and the direction perpendicular thereto, and the average thickness of the rubber continuous phase is in the range of from 0.5 to 3 nm.

10. The polypropylene composition of claim 9, wherein the propylene block copolymer composed of a high crystalle homopolypropylene component and an ethylene/propylene copolymer rubber component contains units derived from ethylene in an amount of 2 to 9 mol %.

11. The polypropylene composition of claim 9, wherein the propylene block copolymer is prepared by using a catalyst formed from a carrier-supported solid titanium catalyst component containing magnesium, halogen, electron donor of aromatic carboxylic ester or alkyl group-containing ether and titanium as essential ingredients on a solid carrier having a specific surface area of not less than 100 $m^2$/g, an organometallic compound catalyst component and an electron donor of an ester compound or ether compound each having a silicon atom.

* * * * *